April 20, 1965
W. HAMILTON
3,179,402
HATCH COVER TRUCK STRUCTURE
Filed March 20, 1963
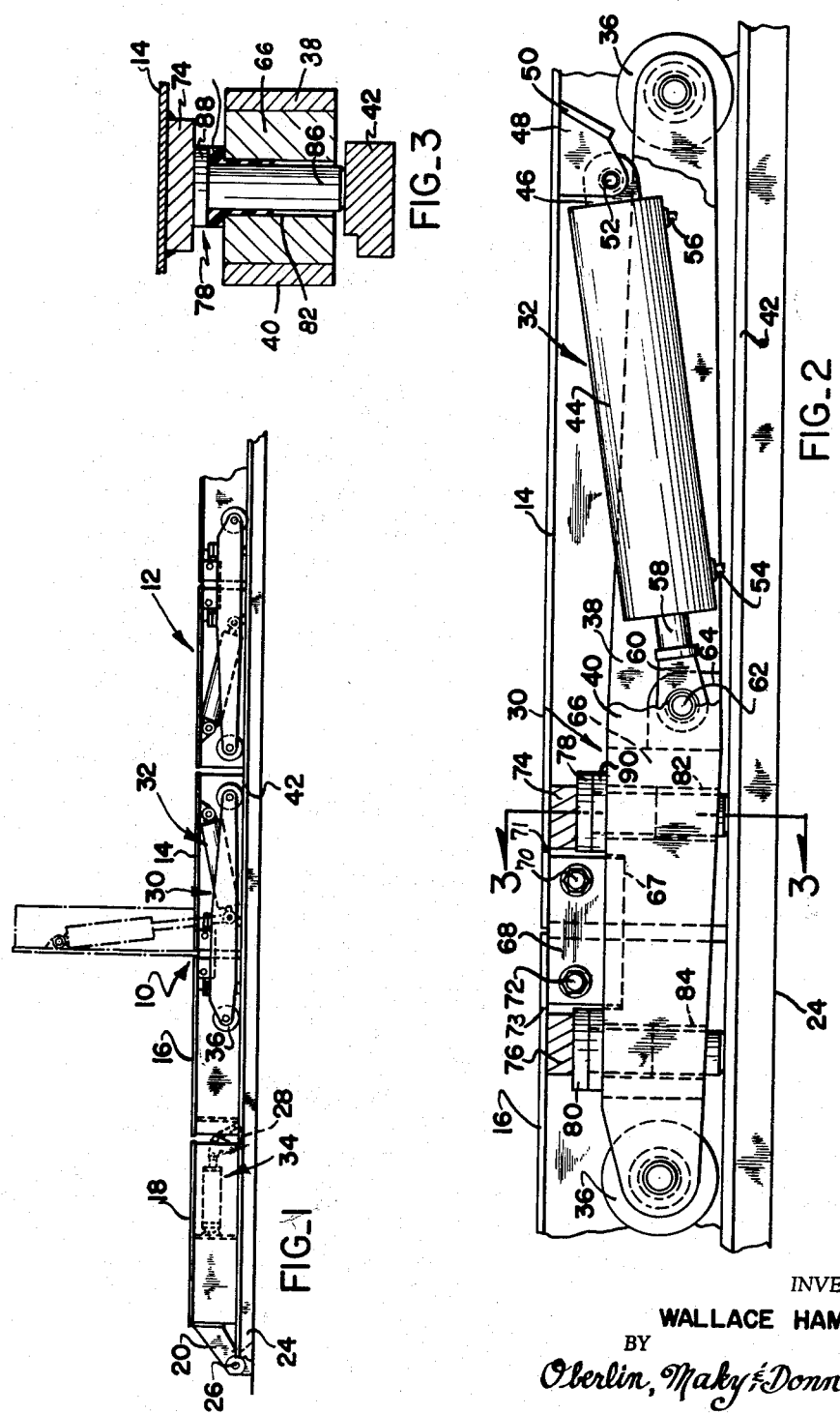
INVENTOR.
WALLACE HAMILTON
BY
Oberlin, Maky & Donnelly
ATTORNEYS … # 3,179,402
HATCH COVER TRUCK STRUCTURE
Wallace Hamilton, Bentleyville, Ohio, assignor to PneumoDynamics Corporation, Cleveland, Ohio, a corporation of Delaware
Filed Mar. 20, 1963, Ser. No. 266,722
8 Claims. (Cl. 268—18)

This invention relates in general to hatch covers and more specifically, as indicated, to improved hatch cover truck structure. The term hatch cover truck as used herein is employed in a generic sense and refers to roller supported structure for disposal at opposite sides of the cover with such trucks usually engaging side coaming tracks for movement therealong, in order to movably support the cover.

In certain conditions of use, for example, where the hatch cover is associated with a between-deck hatchway, cargo is loaded on the closed cover, which in use of the common roller truck support substantially adds to the load on the rollers and the bearings therefor. Repeated increased loading of the roller assemblies can result in excessive wear and premature damage, for example, accelerated hardening, costly and time-consuming replacement thereof. As is known in the art, covers of the indicated usage are ordinarily simpler than main deck covers fully equipped with seals, jacking devices and the like, and to employ such accessories would materially and probably without justification add to the cost of the simpler, less demanding type of installation of prime concern here.

It is, accordingly, a principal object of the present invention to provide a truck structure on the order discussed and the use range indicated wherein the direct cover load on the truck rollers is relieved when the hatch cover is in its closed position.

Another object of the invention is to relieve such loading of the truck rollers by vertically raising the same from engagement with the coaming track or the equivalent support when the cover moves to a closed position.

A further object is to provide truck structure for a folding type of hatch cover in which fixed and rugged rests or supports effectively and automatically take over the cover support from the truck rollers when the cover is closed.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a side elevational view of a hatch cover assembly, in closed position, embodying the truck structure of the invention;

FIG. 2 is a fragmentary side elevational view of the truck embodying the invention on an enlarged scale, with the cover again in the closed position; and FIG. 3 is a sectional view taken on lines 3—3 of FIG. 2, showing more clearly the rest device provided for support of the closed cover in lieu of the rollers which afford the movable support in other conditions of the cover.

Referring now to the drawings, wherein like parts are designated by like reference characters, the hatch cover assembly embodying the truck structure of the invention is shown in FIG. 1 as being of folding type and comprising a first multi-panel section generally indicated at 10 and a second such section cooperable therewith generally indicated at 12. In this embodiment, the sections 10 and 12 serve cooperably to close the hatch opening when in their horizontal solid line, FIG. 1 positions. As will become apparent, the hatch cover truck structure forming the present invention can be employed with hatch cover assemblies other than the type thus illustrated.

The cover sections 10 and 12 are identically constructed and accordingly only one need be described in detail. The section 10 thus comprises plural panels 14, 16 and 18, with the outboard panel 18 having hinges 20 pivotally connecting the same to the coaming 24 at the pins 26. The panels 16 and 18 are hingedly interconnected adjacent the bottom oppositely disposed faces thereof as shown at 28, while the panels 14 and 16 are pivotally connected at the tops of their adjacent edges to an elongated truck generally indicated at 30. As will be more specifically explained hereinbelow, the truck 30 carries power means, preferably a hydraulic actuator, generally indicated at 32 for selectively independently moving the inboard panel 14 between the dashed and solid line portions thereof as shown in FIG. 1. A separate power actuation means, also preferably hydraulic, generally indicated at 34 is provided operatively between the hinged panels 16 and 18 for moving them from the illustrated closed coplanar position to an upwardly folded opened condition. This last type of folding is well-known and widely employed and need not be described further for full understanding of the present truck improvements.

The truck 30 is provided at opposite ends thereof with rollers 36 mounted between parallel side members 38 and 40, the rollers of course making it possible to open the cover section when supported thereon by the usual folding or other equivalent retraction. The rollers 36 are opposed to or engaged with a coaming track 42 as will be later morefully explained. The actuator 32 on the truck is in the form of a piston-cylinder assembly 44 having a cylinder tongue 46 at the outer end between downwardly depending spaced arms 48 of a support member 50 rigidly connected by any suitable means to the underside of panel 14. Pin 52 extends through aligned openings in tongue 46 and arms 48 to provide relative pivoting of the actuator and panel. The piston-cylinder assembly 44 is of double-acting type with fluid supply lines 54 and 56 communicating with opposite sides of the piston therein. The extending piston rod 58 is provided with a terminal tongue 60 pivotally connected to the truck 30 on a through pivot pin 62 supported by bearings 64 mounted in the truck side members 38 and 40.

The truck is provided with a substantially solid body portion 66 which is rigidly secured between the truck sides 38 and 40, the body portion 66 being recessed at 67 to fixedly support a mounting block 68 extending upwardly therefrom.

Cover panels 14 and 16 are each pivotally connected to the block 68 by pivot pins 70 and 72 respectively extending through openings in the block 68 and the vertical side flanges of the panels 14 and 16. The top plates of the panels 14 and 16 are cut out at the corners above the mounting block 68 to provide clearance obviously necessary to permit pivotal movement of the panels upwardly about the pins 70 and 72, such cut out corners being indicated at 71 and 73. It should now be clear that supplying hydraulic fluid through line 56 to the assembly 44 will cause the panel 14 to pivot upwardly around pin 70 to a vertical position, as shown in the dashed lines in FIG. 1. Similarly, fluid directed through supply line 54 will effect lowering of the panel 14 to the closed position. Cover panel 16 is free to pivot about pin 72 in the aforenoted folding movement of the panels 16 and 18.

Panels 14 and 16 are provided with stop plates 74 and 76, respectively, preferably welded to the undersides of the panel tops which extend over the truck 30. These plates 74 and 76 are provided for engagement with pins 78 and 80, respectively, when the panels 14 and 16 are in, or closely approaching, the closed position. Pins 78 and 80 are identical and are loosely mounted in vertical openings 82 and 84 formed in the truck body 66. The bottoms of the pins 78 and 80 contact the track 42 when the plates 74 and 76 engage the headed tops thereof. Referring to FIG. 3, pin 78 comprises a shank 86 and a head 88. Disposed around the upper portion of the shank 86 and beneath the head 88 there is a resilient, preferably rubber, sleeve 90 of hat shape. This sleeve, when uncompressed, spaces the bottom of the pin 78 from engagement with the coaming track, and when compressed, responsive to contact between plates 74 and pin head 88, permits such engagement of the pin and the track.

Referring now to the manner in which the pins 78 and 80 relieve the loading on the rollers 36, as the panels 14 and 16 approach horizontal position in full closure of the cover, the plates 74 and 76 contact the heads of the pins forcing the same downwardly through the truck openings 82 and 84 against the track 42. The pins 78 and 80 are of a length greater than the vertical distance from the undersides of the plates 74 and 76 to the bottom plane of the truck in which the rollers 36 have their lowermost extent. Continued closing movement of the panels thus loads, by the panel weight, the resilient members 90 to compress the same to the extent that the rollers 36 are raised from the track 42, such condition being shown in FIG. 2. The weight of the panels 14 and 16 is thereby transferred entirely to the pins to relieve the loading of the rollers and their bearings. This load transfer enables cargo, for example, to be placed on the closed cover or other addition of weight without causing damage to the truck rollers. When the cover is opened, in this case by raising panel 14 and folding panels 16 and 18, the panel plates 74 and 76 move away from the pins 78 and 80, whereby the latter are lifted clear by expansion of the members 90 and the load of the panels is of course transferred to the truck 30 and its rollers 36 for the retracting movement. Similarly formed and operative trucks are provided at the opposite side of section 10 and the sides of section 12.

It will thus be seen that the present invention provides an extremely simple and inexpensive truck improvement with significant advantages; these obvious benefits, moreover, can be realized by readily accomplished modification of existing cover structure as well as in original equipment.

Other modes of applying the principle of the invention may be employed, change being made as regards the details described, provided the features stated in any of the following claims or the equivalent of such be employed.

I therefore particularly point out and distinctly claim as my invention:

1. In combination with a hatch cover, truck structure to which said cover is pivotally connected, said truck structure including track-engaging roller means for supporting said truck for rolling movement, and movable stop means carried by the truck structure for separate engagement and movement by the cover in closure of the latter, said movement of the stop means transferring the weight of the cover when fully closed from the roller means to the stop means.

2. The combination set forth in claim 1 wherein the stop means comprises a resiliently deformable member and deformation thereof by the weight of the closing cover moves the stop means into the cover supporting condition.

3. The combination set forth in claim 1 wherein movement of the stop means by closure of the cover elevates said roller means.

4. The combination set forth in claim 1 wherein the stop means includes a rigid member vertically movable through the truck, said member being forced downwardly by the closing engagement of the cover with the stop means slightly to hold the roller means elevated in the fully closed cover condition.

5. The combination set forth in claim 4 wherein the stop means includes resiliently deformable means normally holding said rigid member elevated above the bottom of the roller means when the cover is not in its closed condition.

6. In combination with a hatchway provided with tracks disposed at opposite sides thereof, a hatch cover for closing said hatchway, trucks disposed at opposite sides of said hatchway having rollers engageable with said tracks, each of said trucks being pivotally connected to said cover, actuating means for raising and lowering said cover between a closed position and an open position, and movable stop means operated by movement of said cover to the closed position for raising said rollers from said tracks, thereby to relieve the loading on said rollers when said cover is closed.

7. The combination of claim 6 wherein said stop means for raising said rollers from said tracks comprises pin means associated with each truck and extending vertically through openings therein, said cover being provided with pin-engaging means adapted to engage said pin means when said cover moves to the closed position to force said pin means down into contact with said tracks, the vertical distance between the pin-engaging portions of said cover and the bottoms of said pin means being greater than the distance between said portions and the bottoms of said rollers, whereby said rollers are raised from said tracks to relieve the loading of the closed cover thereon.

8. The combination of claim 7 wherein each of said pin means comprises a shank and an enlarged head portion at the tops of the trucks, and resiliently deformable members are disposed between the pin heads and the trucks, said resilient members normally holding the shanks elevated so that the bottoms thereof are above the roller bottoms when the cover is not fully closed.

References Cited by the Examiner

UNITED STATES PATENTS 2,949,091  8/60  Lovell _____ 268—18 X

HARRISON R. MOSELEY, *Primary Examiner.*